United States Patent
Paulussen

(10) Patent No.: US 9,758,321 B2
(45) Date of Patent: Sep. 12, 2017

(54) AUTOMATIC LAYER PICKING ASSEMBLY

(71) Applicant: INTRION NV, Huizingen (BE)

(72) Inventor: Gerard Paulussen, Gooik (BE)

(73) Assignee: INTRION NV, Huizingen (BE)

( * ) Notice: Subject to any disclaimer, the term of this patent is extended or adjusted under 35 U.S.C. 154(b) by 0 days.

(21) Appl. No.: 15/032,263

(22) PCT Filed: Oct. 7, 2014

(86) PCT No.: PCT/EP2014/071413
§ 371 (c)(1),
(2) Date: Apr. 26, 2016

(87) PCT Pub. No.: WO2015/062823
PCT Pub. Date: May 7, 2015

(65) Prior Publication Data
US 2016/0244277 A1    Aug. 25, 2016

(30) Foreign Application Priority Data

Oct. 28, 2013   (EP) .................................... 13190549

(51) Int. Cl.
*B65G 57/00* (2006.01)
*B65G 57/24* (2006.01)
*B65G 61/00* (2006.01)
*B65G 1/137* (2006.01)
*B65G 43/00* (2006.01)
*B65G 57/03* (2006.01)

(52) U.S. Cl.
CPC ........... *B65G 57/24* (2013.01); *B65G 1/1378* (2013.01); *B65G 43/00* (2013.01); *B65G 57/03* (2013.01); *B65G 61/00* (2013.01); *B65G 2201/0267* (2013.01)

(58) Field of Classification Search
CPC ........ B65G 57/24; B65G 57/03; B65G 43/00; B65G 2201/0267
USPC ...................... 414/788.4; 901/6, 7
See application file for complete search history.

(56) References Cited

U.S. PATENT DOCUMENTS 4,783,904 A * 11/1988 Kimura ................. B23P 21/004
198/465.2
4,896,087 A * 1/1990 Onaga .............. G05B 19/41845
414/789.5
(Continued)

FOREIGN PATENT DOCUMENTS

AU       2010235933 A1    5/2011
DE          2062845 A1    7/1972
(Continued)

OTHER PUBLICATIONS

Extended European Search Report for corresponding European Application No. 13190549.9, Apr. 10, 2014.
(Continued)

*Primary Examiner* — Anna Momper
*Assistant Examiner* — Lynn Schwenning
(74) *Attorney, Agent, or Firm* — Workman Nydegger

(57) ABSTRACT

The automatic layer picking assembly for a warehouse comprises a movable layer transporter comprising layer positioner that is operable to position the movable layer transporter with respect to the predetermined pallet positions separately from a pallet transporter during a pallet layer mixing operation.

20 Claims, 10 Drawing Sheets

(56) References Cited

U.S. PATENT DOCUMENTS

| | | | | |
|---|---|---|---|---|
| 5,239,739 A | * | 8/1993 | Akeel | B23K 37/047 |
| | | | | 29/430 |
| 5,268,837 A | * | 12/1993 | Saylor | B25J 9/1661 |
| | | | | 700/248 |
| 2007/0280814 A1 | | 12/2007 | Morency et al. | |
| 2008/0008573 A1 | | 1/2008 | Mitchell | |
| 2008/0131255 A1 | | 6/2008 | Hessler et al. | |
| 2008/0267759 A1 | | 10/2008 | Morency et al. | |
| 2013/0177379 A1 | * | 7/2013 | Hoffman | B65G 57/00 |
| | | | | 414/791.6 |

FOREIGN PATENT DOCUMENTS

| | | | |
|---|---|---|---|
| DE | 4330795 A1 | 3/1995 | |
| EP | 2172381 A1 | 4/2010 | |
| WO | 2008152245 A2 | 12/2008 | |

OTHER PUBLICATIONS

International Search Report for corresponding International PCT Application No. PCT/EP2014/071413, Jan. 12, 2015.

* cited by examiner

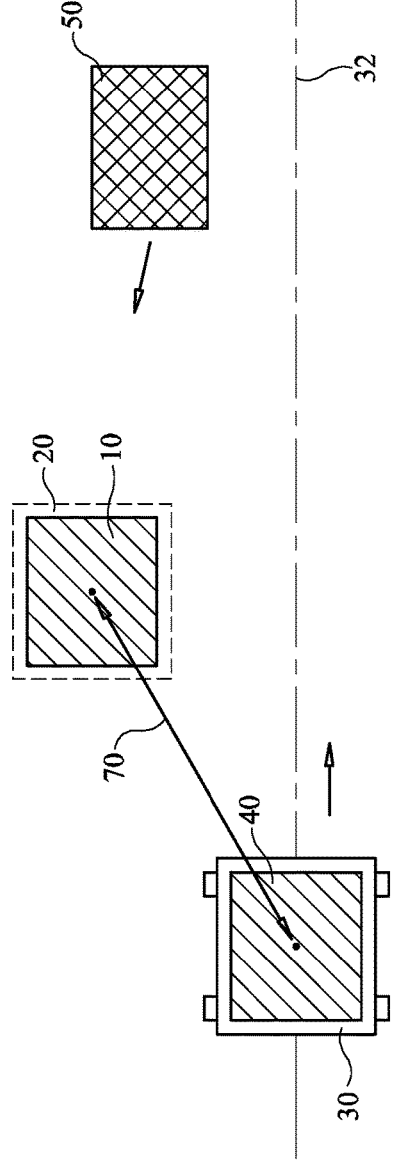
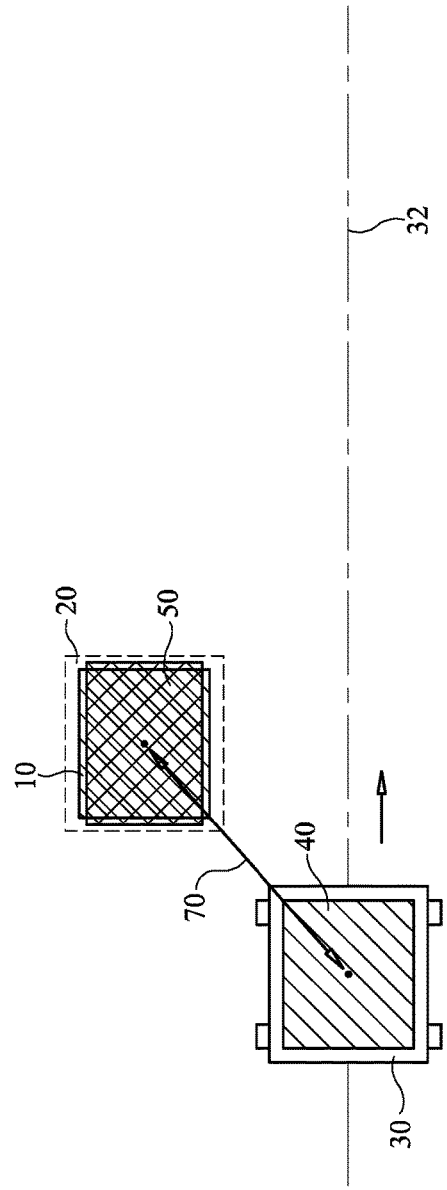

AUTOMATIC LAYER PICKING ASSEMBLY

FIELD OF THE INVENTION

The present invention generally relates to an automatic layer picking assembly. More specifically an automatic layer picking assembly for a warehouse in which products are arranged in layers on pallets, and in which an automatic layer picking assembly is active to compose mixed layer pallets comprising a plurality of pallet layers of different products.

BACKGROUND OF THE INVENTION

Automatic layer picking assemblies for a warehouse suitable for composing mixed layer pallets are for example known from AU2010/235933 (Robotic Automation, 2011), US2008/0267759 (Axium, 2008) and US2008/0008573 (California Natural Products, 2008). These assemblies generally comprise a layer transporter in the form of a robotic arm mounted on a pallet transporter that transports a destination pallet along a plurality of source pallets. During the mixing operation, first the pallet transporter needs to position the destination pallet in close proximity of the source pallet from which a pallet layer needs to be transferred to the destination pallet. Subsequently the robotic arm mounted on the pallet transporter executes a layer transfer operation by positioning its layer picking device at the source pallet, picking a pallet layer from this source pallet, positioning this pallet layer at the destination pallet and placing this pallet layer on the destination pallet. The throughput of such an automatic layer picking assembly is limited by several factors. The inertia of the pallet transporter is relatively large as it needs to transport the destination pallet and the robotic arm, this limits the maximum acceleration and thus also the maximum velocity of the pallet transporter during the mixing operation. Furthermore scalability of such a system is limited as each of the pallet transporters requires a dedicated layer transporter.

An alternative system for producing mixed layer pallets is for example known from US2007/0280814 (Axium, 2007). Such a system comprises a pallet layer transporter, in the form of a robotic arm with a suitable gripper, that decomposes the source pallets and stores its products in an intermediate buffer. Subsequently the destination pallets comprising pallet layers, each comprising different products originating from different source pallets, is compiled by the pallet layer transporter from the products stored in this intermediate buffer. The throughput of such a system is limited by the fact that all destination pallets must be decomposed in their entirety into the intermediate buffer and it is clear that the need for such an intermediate buffer and the associated space requirements, puts limits on the scalability of such a system.

Therefor there still exists a need for an improved automatic layer picking assembly that is able to overcome the above mentioned drawbacks and is able to achieve a simple and efficient setup allowing for improvements relating to throughput and scalability.

SUMMARY OF THE INVENTION

According to a first aspect of the invention there is provided an automatic layer picking assembly, comprising:
A plurality of source pallets each positioned at a pallet position and each comprising products arranged in a plurality of pallet layers;

At least one pallet transporter:
comprising pallet positioner operable to position a pallet with respect to the pallet positions; and
operable to transport a destination pallet during a mixing operation comprising a plurality of layer transfer operations;
A movable layer transporter:
comprising a layer picker and a layer positioner; and
operable to transfer at least one pallet layer from a source pallet to a destination pallet during a layer transfer operation of the mixing operation;
a controller
coupled to the at least one pallet transporter and the movable layer transporter; and
operable to control them such that, during the plurality of the layer transfer operations of the mixing operation, a predetermined destination pallet receives a mixing set of a plurality of the pallet layers from a predetermined set of a plurality of the source pallets,
CHARACTERISED IN THAT
during the mixing operation, the layer positioner is operable to position the movable layer transporter with respect to the predetermined pallet positions separately from the pallet transporter.

This allows for a system with an increased throughput as the separately movable layer transporter can be positioned faster during the layer transfer operation as it has a lower inertia. Additionally also the inertia of the pallet transporter is reduced as the layer transporter is no longer mounted on it. This also reduces the amount of movement operations, especially accelerations, to which the destination pallet, which is inherently less stable by its mixed layer composition, is exposed. Since both the pallet transporter and the movable layer transporter can be moved separately the pallet transporter with the destination pallet does no longer need to be in close proximity of the corresponding source pallet before the layer transfer operation can be initiated. Scalability of the system is also improved as a low inertia, fast moving, layer transporter can concurrently serve more than one pallet transporter and there is no need to decompose the source pallets into intermediate buffers.

According to a preferred embodiment, during each of the layer transfer operations of the mixing operation, during which at least one predetermined pallet layer is transferred from a predetermined source pallet to a predetermined destination pallet on a predetermined pallet transporter, the controller is further configured to control the movable layer transporter such that:
its layer positioner positions it at the pallet position of the predetermined source pallet;
its layer picker picks the at least one predetermined pallet layer from the predetermined source pallet;
its layer positioner positions the at least one predetermined pallet layer at the predetermined destination pallet on the predetermined pallet transporter; and
its layer picker places the at least one predetermined pallet layer from the predetermined source pallet on the predetermined destination pallet.

This allows the movable layer transporter to efficiently execute a layer transfer operation separately from the pallet transporter as the layer positioner are able to separately position the layer transporter during the layer transfer operation.

According to a further embodiment, during each of the layer transfer operations of the mixing operation, during which at least one predetermined pallet layer is transferred from a predetermined source pallet to the predetermined destination pallet, the controller is further configured to control the pallet transporter such that:

its pallet positioner reduces a transfer distance between the predetermined source pallet and the predetermined destination pallet;
while the layer positioner positions the movable layer transporter at the pallet position of the predetermined source pallet; and
before the layer picker picks the at least one predetermined pallet layer from the predetermined source pallet.

In this way the throughput of the system is improved as the first phase of the layer transfer operation can be initiated while the positioning of the destination pallet is still ongoing. Additionally the concurrent reduction of the transfer distance further optimizes the layer transfer operation as executed by the movable layer transporter as the distance that it needs to cover during the subsequent positioning steps is reduced.

Preferably the controller is further configured to control the pallet transporter such that:

its pallet positioner reduces the transfer distance:
after the layer picker picks the at least one predetermined pallet layer from the predetermined source pallet; and
while the layer positioner positions the predetermined source pallet layer at the predetermined destination pallet on the predetermined pallet transporter.

This still further optimizes throughput as also during this positioning step of the movable layer transporter the pallet transporter concurrently reduces the transfer distance it needs to cover.

According to an embodiment the controller is further configured to control the pallet transporter such that its pallet positioner reduces the transfer distance until it reaches a predetermined threshold.

This allows the controller to coordinate the operation of the pallet transporter in a simple and efficient way.

According to a further embodiment the automatic layer picking assembly comprises a plurality of pallet transporters concurrently operable to transport a destination pallet during a plurality of concurrent mixing operations, and in that the controller is further configured to concurrently control:

one of the plurality of pallet transporters to cooperate with the layer transporter during the layer transfer operation of one of the concurrent mixing operations;
another of the plurality of pallet transporters such that its pallet positioner reduces the transfer distance for the next layer transfer operation of another of the concurrent mixing operations.

By optimizing the position of the pallet transporters while the lower inertia, movable layer transporter is cooperating with another pallet transporter for performing a the layer transfer operation of another pallet mixing operation, the throughput of the automatic layer picking assembly can still further be increased.

Preferably the controller is further operable to control the at least one pallet transporters and the movable layer transporter such that during the layer transfer operation the predetermined destination pallet receives the at least one predetermined pallet layer from the predetermined source pallet directly.

Such a direct pallet layer transfer without use of intermediate buffers or decomposition allows for an improved scalability.

According to an embodiment:

the pallet positions of source pallets are arranged linearly, adjacent to each other along at least one pallet position line; and
the pallet transporter is operable to move along at least one pallet transporting line generally parallel to at least one pallet position line.

Such a linear setup is well suited for arranging the system in a warehouse and allows for an efficient layer transfer operation as the transfer distance between the pallet transporter and the source pallet is largely determined by the distance along the pallet transporting line to this source pallet. It is clear that by this linear motion pattern the pallet transporter can move in close proximity of the source pallets, still further optimizing the transfer distance during a layer transfer operation.

Preferably:

the pallet positions of source pallets are arranged linearly, adjacent to each other along a plurality of pallet position lines; and
the pallet transporter is operable to move along at least one pallet transporting line generally parallel to and in between two pallet position lines.

This allows for an optimal use of available floor space as efficient layer transfer operations can be executed on both sides of the pallet transporting line.

According to an embodiment the automatic layer picking assembly a plurality of movable layer transporters. Optionally, each of the movable layer transporters is operable to move in a layer transfer area at least partly comprising at least one of the pallet transporting lines and its adjacent pallet position lines.

This allows for improvements in scalability as a single, low inertia, fast moving layer transporter can serve a plurality of pallet transporters traveling along a layer transfer area assigned to this layer transporter. Such a modular setup thus allows up-scaling of the system by simply duplicating the sub-system in such a layer transfer area.

According to a further embodiment at least one of the pallet transporters operable to transport a destination pallet, is further configured to position a source pallets at a pallet position.

This allows for a simple and modular setup in which the same devices can transport both the destination pallets and source pallets.

According to still a further embodiment the automatic layer picking assembly comprises at least one further pallet transporter separate from the at least one pallet transporter operable to transport a destination pallet, this further pallet transporter operable to position a source pallet at a pallet position with a higher speed and/or acceleration than the at least one pallet transporter operable to transport a destination pallet.

This embodiment offers the advantage that the pallet transporters that position the source pallets are not affected by the limits on acceleration and speed placed on the pallet transporter of the mixed destination pallets because of the reduced inherent stability of their mixed layer structure.

According to a further embodiment the pallet transporter comprises one of the following devices:

an automatic guided vehicle;
a vehicle operable to move along a track;
a robotic vehicle;
a conveyor.

Such devices are well suited as pallet transporter and are well suited to be positioned under control of the controller.

According to a further embodiment the movable layer transporter is a gantry robot comprising a pallet layer manipulator.

Such a gantry robot allows for an implementation that enables the desired degrees of freedom to enable an efficient positioning of the movable layer transporter and an efficient pick and place operation by means of the pallet layer manipulator.

According to a second aspect of the invention there is provided a method for operating an automatic layer picking assembly according to the first aspect of the invention, characterised in that the method comprises the step of the layer positioner positioning the movable layer transporter with respect to the predetermined pallet positions separately from the pallet transporter during the mixing operation.

Such a method of operation results in an increased throughput and improved scalability as a result of the separate positioning of the lower inertia movable layer transporter and the absence of intermediate buffering.

According to an embodiment, the controller further controls the movable layer transporter to perform the steps of:

its layer positioner positioning the movable layer picker at the pallet position of the predetermined source pallet;

its layer picker picking the predetermined pallet layer from the predetermined source pallet;

its layer positioner positioning the predetermined pallet layer at the predetermined destination pallet on the predetermined pallet transporter; and its layer picker placing the predetermined pallet layer from the predetermined source pallet on the predetermined destination pallet, during each of the layer transfer operations of the mixing operation, during which a predetermined pallet layer is transferred from a predetermined source pallet to the predetermined destination pallet on a predetermined pallet transporter.

This allows for an efficient layer transfer operation that can be executed separately from the positioning of the pallet transporting.

BRIEF DESCRIPTION OF THE DRAWINGS

FIGS. 2-6 schematically illustrate different steps of a pallet mixing operation performed by the automatic layer picking assembly of FIGS. 1A-D.

DETAILED DESCRIPTION OF EMBODIMENT(S)

Figure 1A:
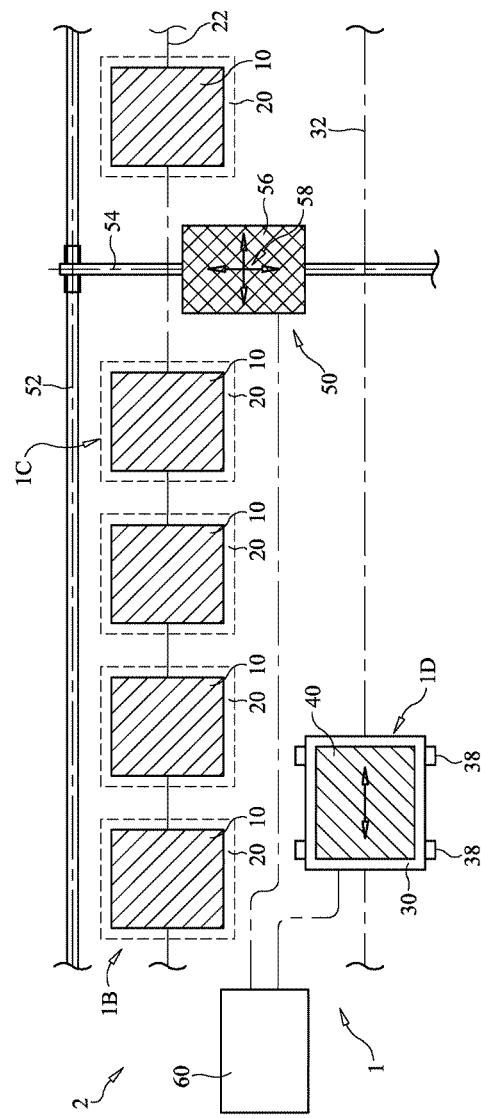
FIGS. 1A-D schematically illustrate an embodiment of the automatic layer picking assembly according to the invention.
Figure 1B:
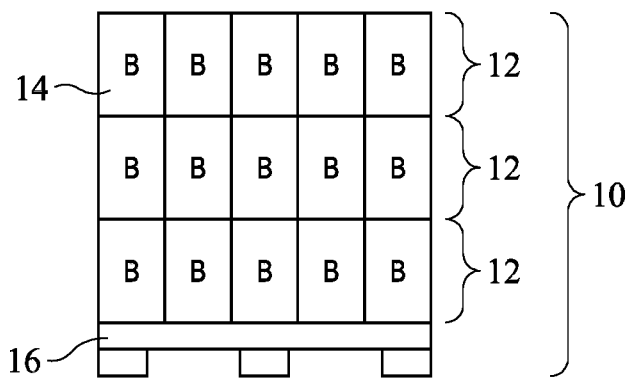
Figure 1C:
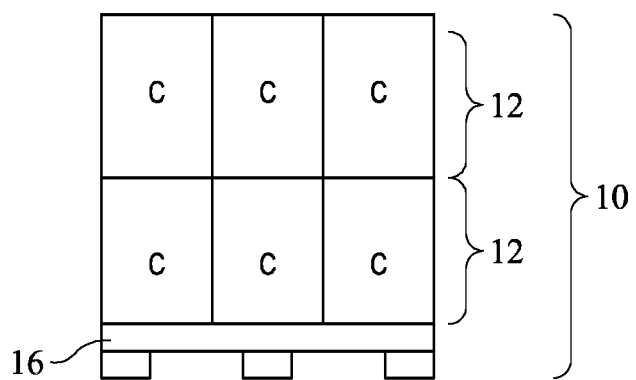

FIG. 1A schematically shows a top view of an automatic layer picking assembly 1 for a warehouse 2. As shown, a plurality of source pallets 10 are each positioned at a pallet position 20. These pallet positions 20 are arranged generally adjacent to each other in a linear fashion along a pallet position line 22. However according to alternative embodiments the pallet positions 20 for the source pallets 10 might be arranged differently. FIGS. 1B and 1C shows a side view of two of these source pallets 10, each comprising products 14 arranged in a plurality of pallet layers 12 on a pallet 16. The source pallet 10 shown in FIG. 1B comprises other products, with other dimensions than the source pallet shown in FIG. 1C and as shown this might result in the pallet layers 12 having different layer heights. It is clear that such a pallet layer 12 is formed by means of a separable, substantially horizontal layer of articles 14 covering substantially the same surface as the pallet 16, and that these pallet layers 12 are stacked on top of each other. Although the embodiments shown in FIGS. 1B and 1C show articles which are also vertically aligned for all pallet layers 12, it is clear that alternative embodiments are possible in which the positions of the articles 14 of each of the pallet layers 12 are shifted with respect to each other thus forming a brick-like bonding arrangement. It is further clear that although the embodiment is described with reference to a warehouse 2, any other suitable operating environment for such an automatic layer picking assembly 1 is possible, such as for example assembly halls, shipping facilities, storage facilities, etc.

Figure 1D:
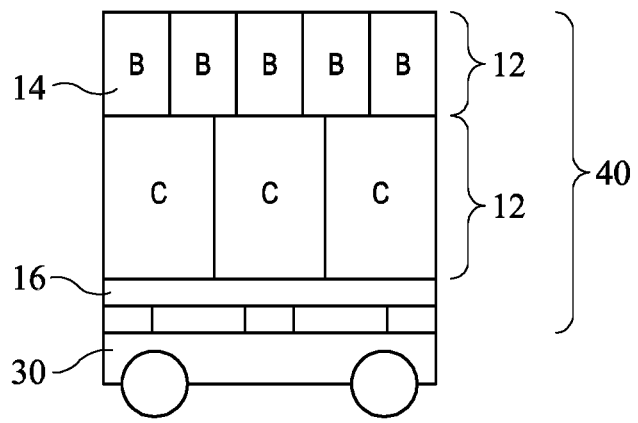

FIG. 1A further shows a pallet transporter 30 that is transporting a destination pallet 40 during a mixing operation as will be explained in further detail with respect to FIGS. 2-6. As shown the pallet transporter 30 moves along the source pallets 10 along a pallet transporting line 32 generally parallel to the pallet position line 22. It is clear that according to alternative embodiments other movement patterns are possible. The pallet transporter 30 could for example be an automatic guided vehicle that is guided along the pallet transporting line 32. According to an alternative embodiment the pallet transporter 30 could for example be a vehicle movable along an overhead rail system along the pallet transporting line 32, such as for example known from EP2172381. According to still a further alternative embodiment the pallet transporter 30 could be another suitable vehicle movable along a track such as for example known from DE4330795 or WO2008152245. According to still a further embodiment the pallet transporter might be implemented as a suitable robotic vehicle. In general, any suitable pallet transporting means 30 comprising pallet positioner 38 that allow it to suitably position a pallet with respect to the pallet positions 20 could be used. During a mixing operation the pallet transporter 30 transports a destination pallet 40 as shown in more detail in FIG. 1D. As shown, the destination pallet 40 comprises a plurality of pallet layers 12 arranged on a pallet 16, the plurality of pallet layers 12 comprising different products 14, possibly resulting in pallet layers 12 with different dimensions. The desired pallet layers 12 to be received by the destination pallet 40 are determined by a mixing set. Such a mixing set determines the number and product 14 of each of the desired pallet layers 12 for the destination pallet. As shown in FIG. 1D the mixing set comprises one pallet layer 12 of the source pallet shown in FIG. 1B and one pallet layer 12 of the source pallet 10 shown in FIG. 1C. It is clear that during such a mixing operation the mixing set could comprise any alternative number of pallet layers of any alternative number of products 14. This means that in general the mixing set, which determines the desired pallet layers 12 for a destination pallet 40 during a mixing operation, comprises a plurality of the pallet layers 12 from a predetermined set of a plurality of the source pallets 10. Optionally the mixing set additionally determines the specific sequence of each of the desired pallet layers 12 on the destination pallet 40. Such a destination pallet 40 comprising at least two pallet layers, each being formed by different products 40, is often referred to as a mixed pallet. Such mixed pallets are especially useful in handling logistics related to medium usage products, for example in the context of a warehouse supplying retail outlets. High usage products can be efficiently supplied from the warehouse at regular intervals as a predetermined number of full pallets. Low usage items can be efficiently supplied as a predetermined number of individual products. However, when medium usage products are supplied in full pallets, this results in the need for increased storage capacity at the retail outlet and when they are supplied as individual products this does not allow an efficient operation both at the warehouse as at the retail outlet as the products can no longer be handled in bulk. Using mixed pallets for supplying the retail outlet reduces the need for storage capacity at the retail outlets while preserving the bulk handling of these products. The sequence of pallet layers 12 in the mixing set can optionally even be further optimized for example in function of the desired sequence for the resupply operation at the retail outlet. Each pallet layer 12 of the mixing set on the destination pallet 40 is transferred from a source pallet 10 comprising the required product 14.

This thus means that each mixing operation comprises a plurality of such layer transfer operations. It is clear that, in the embodiment shown in FIGS. 1A-D, the mixing set on the destination pallet 40 was composed during a mixing operation comprising a layer transfer operation from the source pallet of FIG. 1C and a layer transfer operation from the source pallet of FIG. 1B. The layer transfer operation is executed by means of a movable layer transporter 50 that is capable of transferring a pallet layer 12 from a source pallet 10 to a destination pallet 40. As schematically shown in FIG. 1A, the layer transporter 50 is for example a gantry robot 50 comprising a suitable pallet layer manipulator 56. Such a gantry robot is for example mounted to move generally in a horizontal plane in an area above the source pallet position line 22 and the pallet transporting line 32. In this horizontal plane it is movable along two degrees of freedom, as is generally known for such a gantry robot by means of suitable movement means that allow movement along runway forming a first movement component 52, as shown generally parallel to the source pallet line 22, and also along an overhead bridge forming a second movement component 54, generally transverse the source pallet line 22 and spanning the area of the source pallets 10 and the destination pallet 40. These movement means of the gantry robot in this way form an embodiment of layer positioner 58 that are able to position the layer transporter 50, during a layer transfer operation, in the area generally defined by the source pallet line 22 and the pallet transporting line 32. This means that the layer transporter 50 can be positioned by means of these layer positioner 58 in proximity of a source pallet 10 for picking a pallet layer 12 and in proximity of a destination pallet 40 for placing a pallet layer 12 during a layer transfer operation. The pallet layer manipulator 56 can for example be formed as a suitable gripper, for example a mechanical gripper or a pneumatic gripper, for releasably connecting a pallet layer. This allows for picking a pallet layer 12 from a source pallet 10 when the layer transporter 50 is positioned in proximity of the source pallet by means of the layer positioner 58 and for placing a pallet layer 12 on a destination pallet 40 when the layer transporter 50 is positioned in proximity of the destination pallet 40 by means of the layer positioner 58. In this way the pallet layer manipulator 56 forms a layer picker 56 that is able, in cooperation with the layer positioner 58 to execute a layer transfer operation by transferring a pallet layer 12 from a source pallet 10 to a destination pallet 40. Optionally the pallet layer manipulator 56 might be movable with respect to the layer transporter 50 along additional degrees of freedom. For example it might be hoisted down along a generally vertical direction when positioned above a pallet layer 12 for example in order to bring the pneumatic gripper in contact with the top surface of the pallet layer before picking the pallet layer 12, after which it can be hoisted up again to clear away the picked pallet layer 12 from the source pallet. The same hoisting functionality can for example be executed before and after the gripper places the pallet layer 12 on the destination pallet 40. It is clear that other layer transporters 50 might be suitable for performing the layer transfer operation, as long as in general they comprise layer positioner 58 for positioning the layer transporter 50 with respect to the source pallets 10 and the destination pallet 40 and layer picker 56 allowing for a picking and placing a pallet layer 12.

As further shown in FIG. 1A the pallet transporter 30 and the movable layer transporter 50 are coupled to a controller 60. This can for example be realised by means of a suitable wired or wireless communication network and although controller 60 is schematically illustrated as a distinct component it might be arranged at least partly or in distributed form in separate devices of the automatic layer picking assembly 1, such as for example in the movable layer transporter 50 and/or the pallet transporter 30. During the plurality of the layer transfer operations of a mixing operation the controller 60, in general, controls the layer transporter 50 and the pallet transporter 30 in such a way that a predetermined destination pallet 40 receives a mixing set of a plurality of the pallet layers 12 from a predetermined set of a plurality of the source pallets 10 as will be explained in further detail with reference to FIGS. 2-6.

As mentioned above with reference to the embodiment of FIG. 1A the layer positioner 58 operated by means of the controller 60 to position the movable layer transporter 50 with respect to the predetermined pallet positions 20 separately from the pallet transporter 30 during the mixing operation. This means that in contrast to prior art system the layer transporter 50 is not mounted on the pallet transporter 30 and can rely on its own separate movement means in the form of the layer positioner 58 to position a pallet during a layer transfer operation. As the layer transporter 50 during most layer transfer operations only needs to transport the articles 14 of pallet layers 12 instead of all articles of an entire pallet it is clear that it can result in a lower inertia system than the pallet transporter 30 and can thus be moved around faster, which results in faster layer transfer operations and an increased throughput of the automatic layer picking assembly 1.

Figure 4:
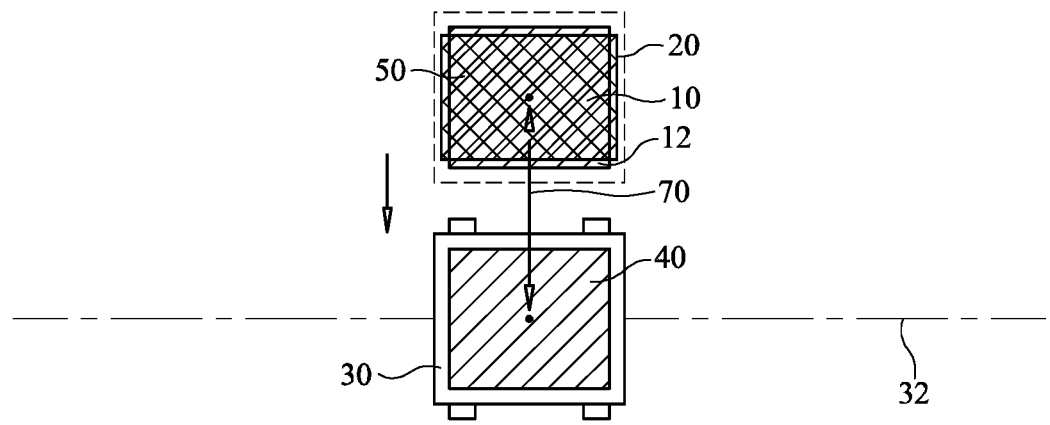

As will be explained now with reference to the embodiment of FIGS. 2-6, during each of the layer transfer operations of the mixing operation a predetermined pallet layer 12 is transferred from a predetermined source pallet 10 to a predetermined destination pallet 40, which is on a predetermined pallet transporter 30. The controller 60 coordinates these layer transfer operations by controlling the operation of the pallet transporter 30 and the movable layer transporter 50. As shown in FIG. 2 the layer positioner 58 positions the movable layer transporter 50 at the pallet position 20 of the predetermined source pallet 10 comprising the pallet layer 12 with the products 14 that need to be transferred to the destination pallet 40. Subsequently at FIG. 3, the layer transporter 50 is positioned above this predetermined source pallet 10 and the layer picker 56 picks the predetermined pallet layer 12 from this predetermined source pallet 10 for example by placing its pneumatic gripper on top of this layer and creating a suitable vacuum for attaching to this predetermined pallet layer 12. Subsequently as shown in FIG. 4, the layer positioner 58 starts moving this predetermined pallet layer 12 in the direction of the predetermined destination pallet 40 until it is positioned at the predetermined destination pallet 40 on the predetermined pallet transporter 30 as shown in FIG. 4. Then the layer picker 56 places this predetermined pallet layer 12 on the predetermined destination pallet 40, for example by lowering the pneumatic gripper until this predetermined pallet layer is placed on top of the destination pallet or any previous pallet layer 12 already present thereon and releasing this predetermined pallet layer 12 by removing the vacuum created by the pneumatic gripper. Subsequently as shown in FIG. 6 the next layer transfer operation of the mixing operation is engaged by the controller 60 by controlling the layer positioner 58 such that it moves the layer transporter 50 towards the next source pallet position 20 where a source pallet is stored comprising a next pallet layer 12 of the mixing set.

Figure 5:
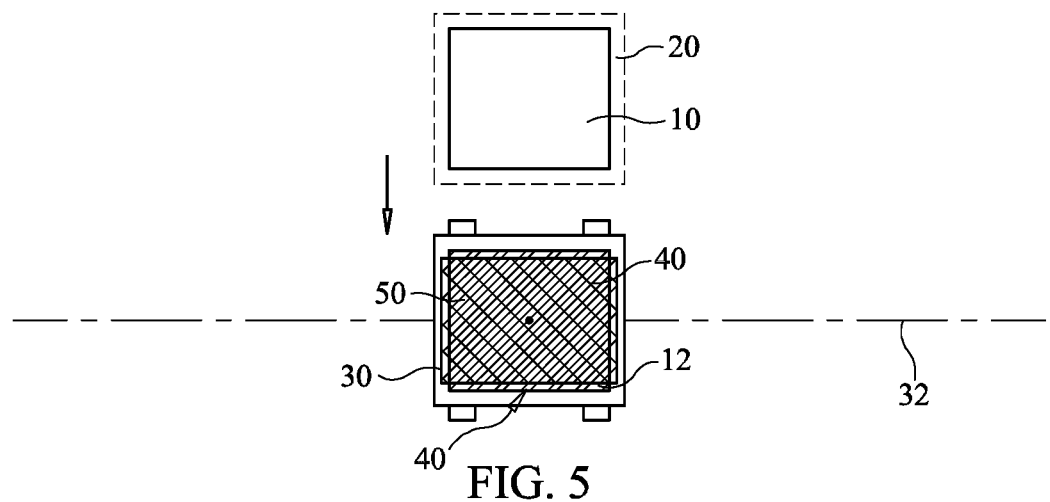
Figure 6:
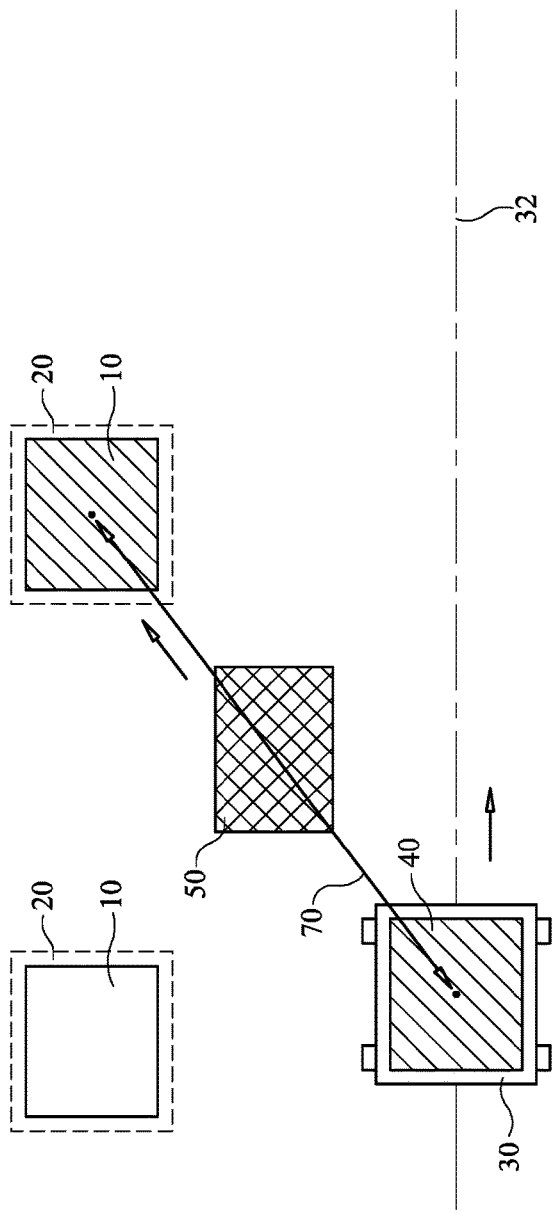

According to the embodiment shown in FIGS. 2-6, during each of the layer transfer operations of the mixing operation the controller 60 also controls the pallet transporter 30. As shown in FIG. 2 the pallet positioner 38 moves the pallet transporter 30 along the pallet positioning line 32 in such a way that the transfer distance 70 is reduced. This means the distance between the predetermined source pallet 10 and the predetermined destination pallet 40 involved in the layer transfer operation is reduced. A more efficient transfer operation results from this reduction of the transfer distance 70 in the state of the layer transfer operation as shown in FIG. 2, this means while the layer positioner 58 positions the movable layer transporter 50 at the pallet position 20 of the predetermined source pallet 10 and before the layer picker 56 picks this predetermined pallet layer 12 from the predetermined source pallet 10. As the distance the pallet layer 12 will need to cover after it has been picked is reduced and this action does not delay the start of the operation of the layer transporter 50 during a layer transfer operation. As shown in FIG. 4, after the layer picker 56 has picked the predetermined pallet layer 12 from the predetermined source pallet 10. The pallet transporter 30 is positioned in close proximity to the source pallet and halted. The controller 60 can realise this by instructing the pallet transporter 30 to keep on moving by means of the pallet positioner 38 until the transfer distance 70 reaches a predetermined threshold, for example when the transfer distance 70 is lower than the predetermined threshold. As shown in FIG. 5 the pallet transporter can then remain stationary until the layer transfer operation is completed by the layer transporter 50 placing the predetermined pallet layer 12 on the destination pallet. A next layer transfer operation is then initiated by the controller 60, as shown in FIG. 6, by separately moving both the pallet transporter 30 and the layer transporter 50. The slower moving pallet transporter 30 is moved along the pallet positioning line 32 such that it reduces the transfer distance 70 for the next pallet layer 12 to be transferred during the mixing operation while the faster layer transporter 50 is moved by the layer positioner 58 towards this layer 12 for picking.

Figure 7:
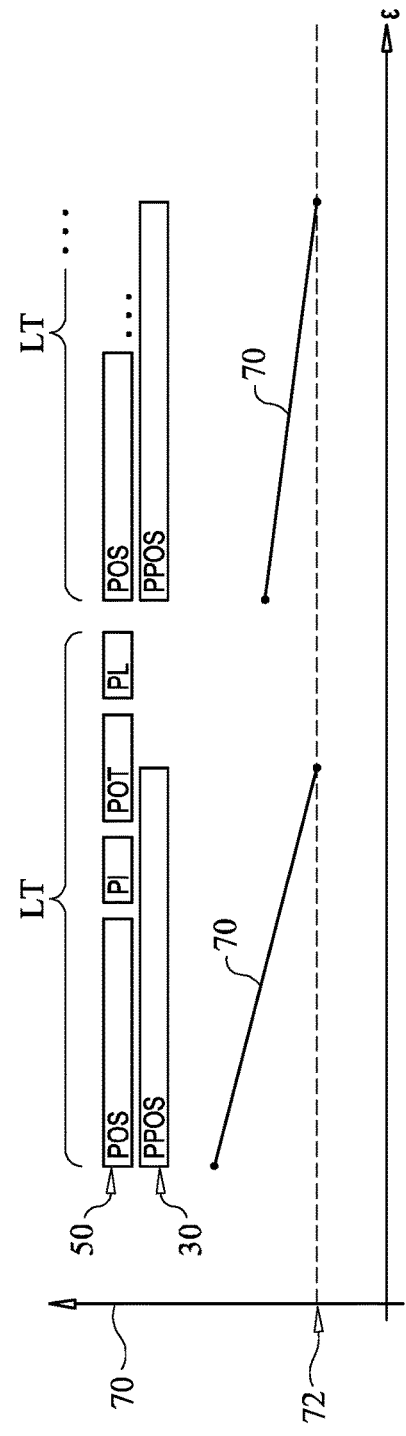
FIGS. 7 and 8 schematically embodiments of the method of operation of the automatic layer picking assembly of FIGS. 1A-D.

An embodiment of the method of operation similar that as explained with reference to FIGS. 2-6 is schematically represented in FIG. 7. It shows the different operating phases during a plurality of the layer transfer operations LT of a mixing operation. During a first step POS the layer positioner 58 of the layer transporter 50 positions the movable layer picker 56 at the pallet position 20 of the predetermined source pallet 10 similarly as shown in FIG. 2. During a subsequent step PI the layer picker 56 picks this pallet layer 12 at the source pallet 10, for example by means of a gripper as described above with reference to FIG. 3. Then at step POT the layer positioner 58 transports this pallet layer 12 being held by the layer picker 56 to the destination pallet 40 on the pallet transporter 30 as shown in FIG. 4. Finally at step PL the layer picker 56 places the pallet layer 12 on the destination pallet 40 as shown in FIG. 5. Thus completing the layer transfer operation LT after which a subsequent layer transfer operation LT of the mixing operation is initiated by the layer positioner 58 again executing the first step POS in which it positions itself at the next source pallet 10 as shown in FIG. 6. These layer transfer operations are repeated until all layer transfer operations of the mixing operation are executed by the layer transporter 50 upon which a subsequent mixing operation can be initiated. As further shown in FIG. 7, concurrently, but separately, the pallet transporter 30 is operated by the controller such that its pallet positioner 38 moves it along the pallet positioning line 32 during a step referred to as PPOS in FIG. 7. As described before with reference to FIGS. 2 and 3 the pallet positioner 38 moves the pallet transporter 30 during the POS and PI step of the layer transporter 50. However different from the situation shown in FIG. 4, the pallet transporter 30 also keeps on moving during the POT step while the layer transporter 50 is concurrently moving the pallet layer 12 from the source pallet 10 to the destination pallet 40. As shown in FIG. 7 during the PPOS step the movement of the pallet transporter 30 is controlled such that the transfer distance 70 between the source pallet of pallet layer 12 involved in the transfer operation and the destination pallet 40 is reduced. According to this embodiment the movement of the pallet transporter 30 is stopped when it is lowered to a predetermined threshold 72. It then remains stationary until initiation of the next layer transfer operation LT. The PPOS step is again commenced and the pallet transporter 30 is again moved to reduce the transfer distance to the pallet layer 12 of the source pallet involved in this next layer transfer operation.

It is however clear that according to alternative operational circumstances or alternative embodiments the PPOS step in which the pallet transporter 30 is positioned can stretch as far as the PL step in which the layer transporter 50 places the pallet layer 12 on the destination pallet if the control system 60 is able to coordinate movement of both the layer transporter 50 and the pallet transporter 30 to place the pallet layer 12 on a moving destination pallet 40. It is also clear that according to still further embodiments alternative constraints could be imposed to the steps of the operating method mentioned with reference to FIG. 7. Such a constraint could for example be that, because of the degrees of freedom of the layer positioner it is required to position the pallet transporter in alignment with the source pallet 10 before the POT phase during which the layer is moved from the source pallet to the destination pallet and PL phase during which the pallet layer 12 is placed on the destination pallet 40. This could for example be the case for an embodiment of the layer transporter 30 that enables a layer transfer operation by means that linearly transfer a pallet layer 12 from the source pallet 10 to the destination pallet 40 that needs to be positioned in linear alignment with it. In such a case the control system 60 would coordinate the operation of the layer transporter 50 such that it does not start the POT and PL phases before the PPOS phase of the operation of the pallet transporter 30 ended, for example by positioning it in line with the source pallet of this pallet layer, which could be expressed by means of a suitable transfer distance threshold. According to still a further alternative embodiment the PPOS phase of the pallet transporter 30 does not have to end as soon as the transfer distance is lowered to the predetermined threshold as shown in FIG. 7. The PPOS phase could for example continue, even when the transfer distance 70 continues to lower beyond the predetermined threshold 72, for example by still moving the destination pallet 40 closer to the pallet layer 12 involved in the transfer operation, or potentially even keep on moving the destination pallet 40 when passing this pallet layer 12 and only halting when the transfer distance would rise above the predetermined threshold 72.

Figure 8:
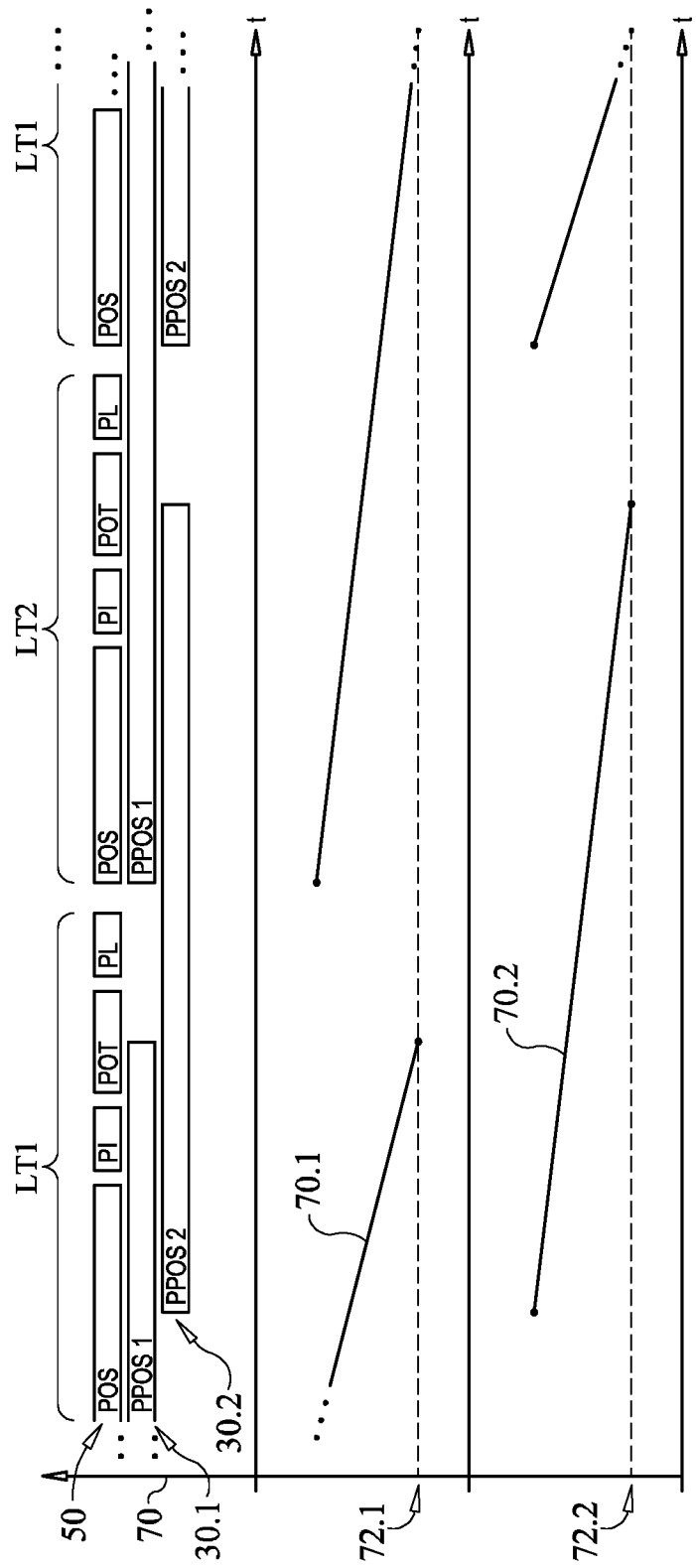

FIG. 8 shows still a further embodiment of the operation of an automatic layer picking assembly 1 comprises two pallet transporters 30.1, 30.2. A first pallet transporter 30.1 transports a first destination pallet 40 involved in a first mixing operation and concurrently a second pallet transporter 30.1 operable to transport a second destination pallet 40 involved in a second mixing operation. It is clear that what will be described with reference to the embodiment of FIG. 8 can be applied to any other alternative embodiment comprising three, four, five or any other suitable plurality of pallet transporters, each operated concurrently during a plurality of concurrent mixing operations under control of the control system 60. The operational steps shown in FIG. 8 are related to two concurrent mixing operations. The layer transfer operations LT1 are related to a first mixing operation involving the first pallet transporter 30.1 and the layer transporter 50. The layer transfer operations LT2 are related to a second, concurrent mixing operation involving the second pallet transporter 30.2 and the layer transporter 50. As shown, similarly as explained with reference to FIG. 7, during the layer transfer operation LT1 of the first mixing operation, the layer transporter 50 operates according to the steps referred to as POS, PI, POT and PL, during which subsequently it is positioned to the source pallet 10, picks the pallet layer 12, is positioned at the destination pallet 40 of the first pallet transporter and places the pallet layer 12 on this destination pallet 40. Concurrently during this layer transfer operation LT1, as described above with reference to FIG. 7, the first pallet transporter 30.1 executes the PPOS1 phase by moving the destination pallet 40 such that the transfer distance 70.1 is reduced until a predetermined threshold 72.1 is reached. While this layer transfer operation LT1 of the first mixing operation is taking place, as shown, the second pallet transporter 30.2 already initiates the PPOS2 phase during which the transfer distance 70.2 for the next layer transfer operation LT2 of the second concurrent mixing operation is already reduced. Subsequently this layer transfer operation LT2 of the second mixing operation is executed by means of the operational steps POS, PI, POT, PL for the layer transporter 50 and continuing the PPOS2 operational step for the second pallet transporter 30.2 until the transfer distance 70.2 reaches a predetermined threshold 72.2. As shown now the PPOS1 operational step of the first pallet transporter 30.1 is already initiated during this layer transfer operation LT2. In this way the faster, lower inertia, layer transporter 50 is able to serve two or alternatively more higher inertia pallet transporters 30.1, 30.2 and these pallet transporters 30.1, 30.2 can reduce the respective transfer distance 70.1, 70.2 while the layer transporter 50 is executing a layer transfer operation of another, concurrent mixing operation thus still further optimizing the efficiency of each of the concurrent mixing operations.

Figure 11:
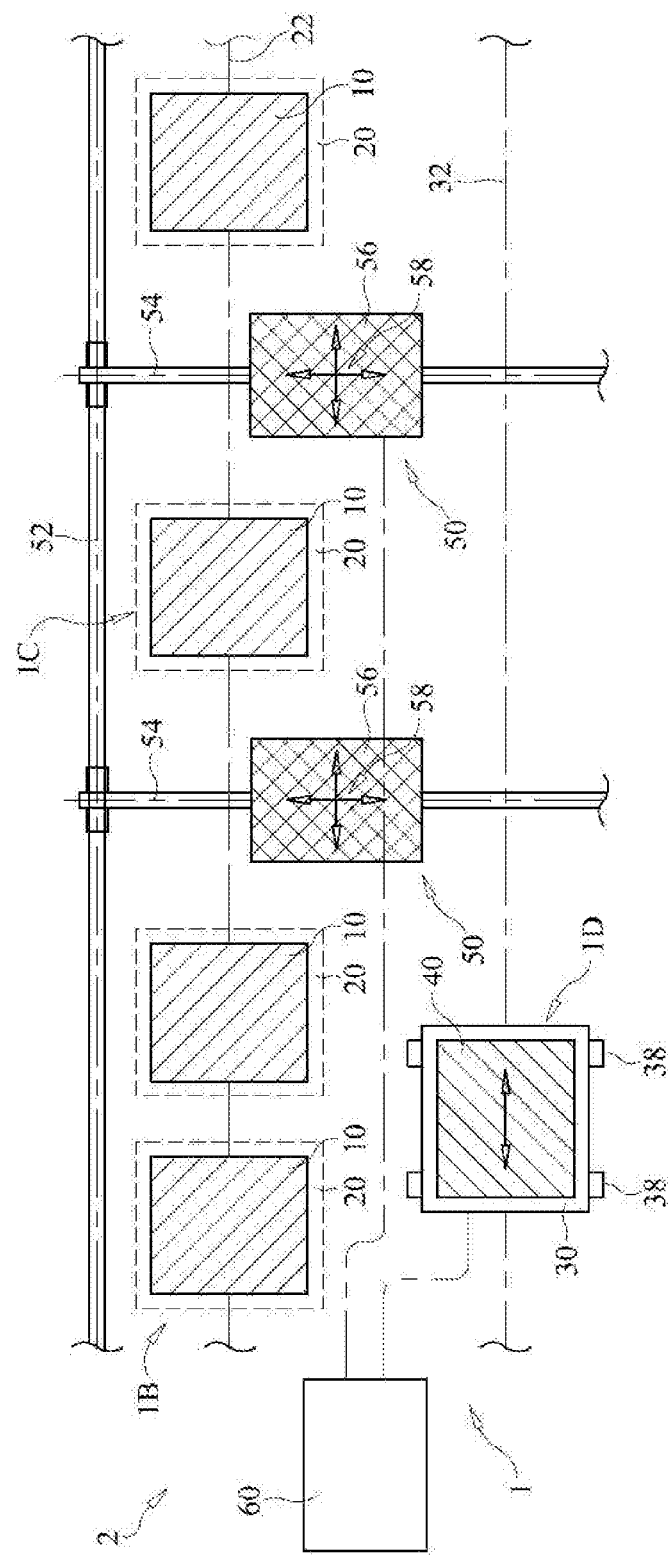
FIG. 11 schematically illustrates another embodiment of the automatic layer picking assembly.

According to the embodiment of FIG. 1A the pallet positions 20 of source pallets 10 are arranged linearly, adjacent to each other along a pallet position line 22. The pallet transporter 30 then moves along a pallet transporting line 32 generally parallel to at least one pallet position line 22. This allows for a simple and efficient setup in which the pallet transporter 30 can move in close proximity of the source pallets, generally reducing the component of the transfer distance transverse to the pallet transporting line 32. Although the pallet position line 22 in FIG. 1A is a straight line, it is clear that other linear shapes, such as curved, angled, . . . are possible according to alternative embodiments. It is further clear that the number of pallet positions 20 arranged in such a linear fashion, and thus generally forming rows or lines of pallet positions 20 can be higher than the one shown in FIG. 1A. The automatic layer picking assembly 1 could for example comprise any suitable plurality of such linearly arranged rows of pallet positions 20 along a pallet position line 22, each having sufficient space to allow for movement of the pallet transporter 30 along a corresponding pallet transporting line 32. It is clear that generally such a plurality of pallet positions 20 will be arranged in a plurality of parallel rows of such pallet positions 20 as this normally makes optimal use of the available floor-space of the warehouse. According to still a further alternative embodiment the pallet positions 20 of source pallets 10 are arranged linearly, adjacent to each other, along a plurality of pallet position lines 22, thus forming for example a plurality of rows of pallet positions 20. These rows of pallet positions are arranged such that the pallet transporter 30 can move along a pallet transporting line 32 generally parallel to and in between two pallet position lines 22. This means that the pallet transporter 30 has available at both sides of the transporting line 32 source pallets 10 for which the vertical component of the layer transfer distance 70 can be minimized, while maintaining a simple movement pattern. Such a modular setup of the warehouse is well suited for use in combination with an embodiment comprising a plurality of movable layer transporters 50, as shown in FIG. 11. In FIG. 11, the same reference characters are used to denote like features, elements, and components as other embodiments described herein. These movable layer transporters 50, for example in the form of a gantry robot, then each cover a layer transfer area defined by at least a part of the one or more pallet transporting lines 32 and their adjacent pallet positions along their pallet position lines 22. However also in other embodiments described above multiple layer transporters 50 could be concurrently active in serving multiple pallet transporters 30 during a plurality of concurrent mixing operations.

It is further clear from all the embodiments described above that the controller 60 during a layer transfer operation controls the pallet transporter 30 and the movable layer transporter 50 such that the destination pallet 40 involved in the receives the pallet layer 12 from the predetermined source pallet 10 directly, which means without the necessity to make use of an intermediate buffer or to split up the pallet layer 12 into individual articles 14.

Preferably the pallet transporter 30 comprises a pallet loader that is capable of automatically loading a pallet, for example from an endless conveyor transporting pallets in the warehouse, or from an automatic or manually controlled forklift. The pallet loader is preferably also able to unload the pallet from the pallet transporter 30 under control of the controller 60. In this way the destination pallet 40 can be loaded and unloaded in an automated way from the pallet transporter 30 before initiation of the mixing operation and after completion of a mixing operation. According to an embodiment the pallet loader of the pallet transporter 30 is also able to automatically load source pallets 10 that need to be transported to specific pallet positions 20 in the automatic layer picking assembly 1, where they can then be unloaded again. Or alternatively to load empty source pallets 10 to free up their pallet position 20 for a new source pallet. In this way the pallet transporters 30 operating in the automatic layer picking assembly 1 can be flexibly and adaptively controlled to take part in layer transfer operations or source pallet resupply operations thus creating a flexible and scalable setup without increasing complexity.

Figure 9:
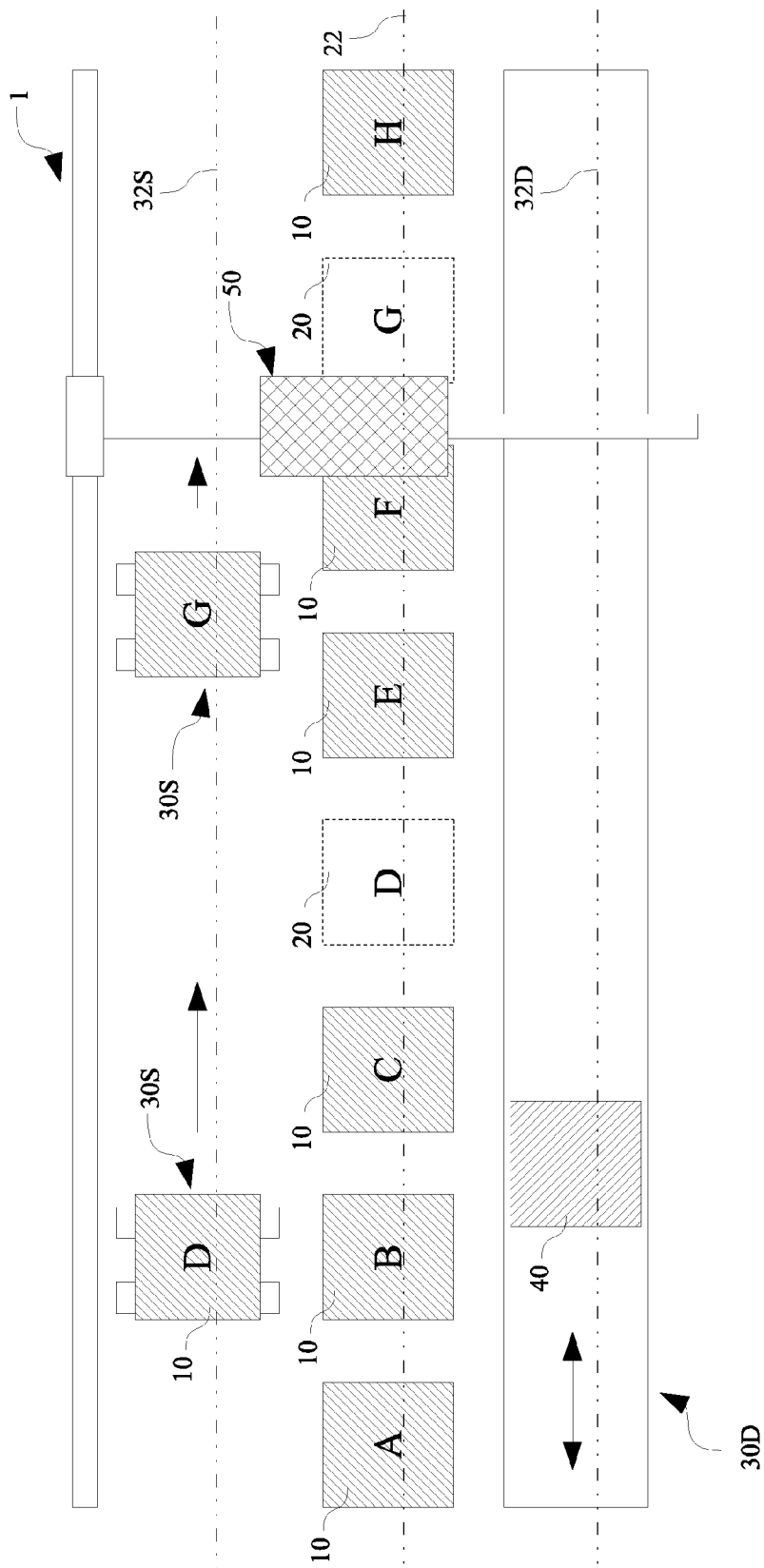
FIGS. 9, 10A and 10B schematically illustrate alternative embodiments of the automatic layer picking assembly according to FIGS. 1A-D.

FIG. 9 shows an alternative embodiment of the automatic layer picking assembly 1. Similarly as in the embodiment of FIGS. 1A-D a plurality of pallet positions 20 for source pallets 10 is arranged along a pallet position line 22. However here separate pallet transporters 30S, 30D are provided for positioning the source pallets 10 and the destination pallets 40 respectively. As shown the pallet transporter 30D configured to position the destination pallet 40 is a suitable conveyor, such as for example an endless conveyor, such as a chain or belt conveyor, that positions the destination pallet 40 along a destination transporting line 32D generally parallel to the pallet position line 22. In general such a conveyor thus comprises a pallet positioner, for example in the form of a suitable chain drive cooperating with the transport chain of the conveyor under the control of the controller 60, that in this way allows to suitably position the destination pallet 40 with respect to the pallet positions 20 for the source pallets 10. Two further pallet transporters 30S, similar to those shown in FIG. 1A, are shown which are separate from this conveyor forming the pallet transporter 30D to position the destination pallet 40. These further pallet transporters 30S are each operable to position a source pallet 10 at a pallet position 20. One of the further pallet transporters 30S is shown carrying a source pallet 10 with pallet layers 12 comprising products labelled D will be suitably controlled by the controller 60 to position this source pallet 10 at a suitable pallet position 20 equally labelled D in FIG. 9. Another further pallet transporter 30S will be suitably controlled by the control system 60 to position another source pallet comprising different products labelled G at a corresponding pallet position also labelled G in FIG. 9. In this way the controller 60 will control these further pallet transporters 30S to continuously position source pallets 10 comprising particular products on suitable pallet positions 20 as schematically shown in FIG. 9, the source pallets 10 comprising products labelled A to H. When performing this source pallet positioning operation these further pallet transporters 30S, as schematically shown in FIG. 9, move along a source transporting line 32S generally parallel to the pallet position line 22. As shown in the embodiment in FIG. 9 the source pallet transporting line 32S is positioned such that the movement path 32S of the further pallet transporters for the source pallets 10 does not interfere with the movement path 32D of the pallet transporter for the destination pallet 40 along the destination pallet transporting line 32D. This is particularly beneficial when the further pallet transporters 30S for the source pallets are operated at higher speeds and/or acceleration than the transporter 30D for the destination pallet 40. In this way the source pallet position operation can be efficiently performed as in general the source pallets 10 can be transported at higher speeds and/or accelerations then the mixed layer destination pallets 40. This is a consequence of the lower level of inherent stability present in the mixed layer destination pallets 40 when compared to the source pallets 10 comprising only a single product type. In this way the throughput achieved when positioning source pallets 10 at suitable pallet positions is not limited by the limits for securely positioning destination pallets 40. Similarly as explained with reference to the embodiments above, the pallet mixing operation can be performed by the separate movable layer transporter 50 and the pallet transporter 30D for the destination pallet 40, preferably reducing the transfer distance 70 between the predetermined source pallet 10 and the predetermined destination pallet 40 involved. For example during a pallet mixing operation in which the destination pallet 40 is to receive two pallet layers of the products labelled A, one pallet layer of product labelled C and three pallet layers of product labelled G. The conveyor 30D could for example be controlled by the controller 60 to first position the destination pallet at the height of the source pallet position related to product B, during which concurrently the layer transporter 50 transfers the required number of pallet layers from the source pallets comprising product A and product C. Subsequently the conveyor 30D could move the destination pallet in the direction of the source pallet position for product G, while concurrently also layer transporter 50 is moved over to that position, which is shown to be resupplied by the further pallet transporter 30S that can move faster and is not hindered by conveyor 30D to perform this resupply operation, thus still further increasing the throughput during the mixing operation.

Figure 10A:
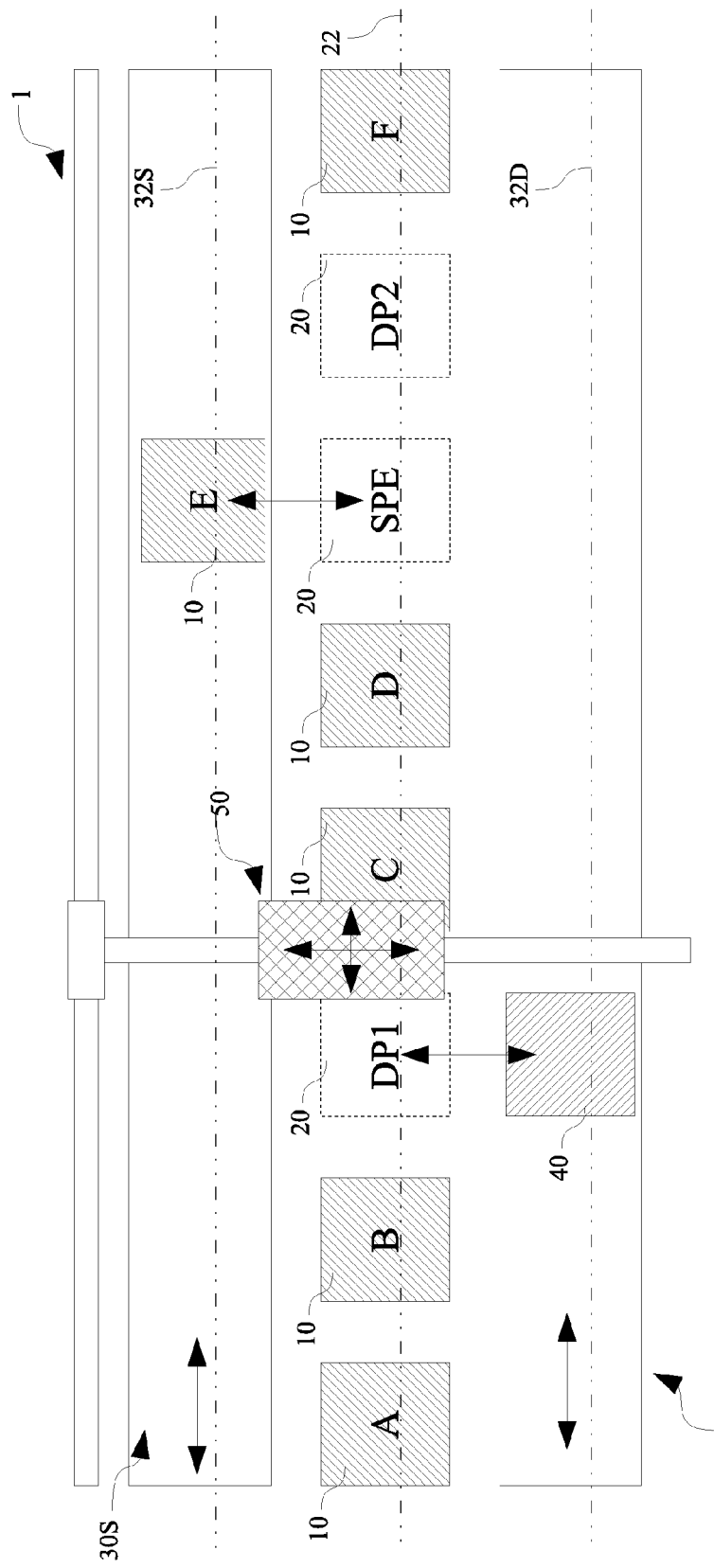
Figure 10B:
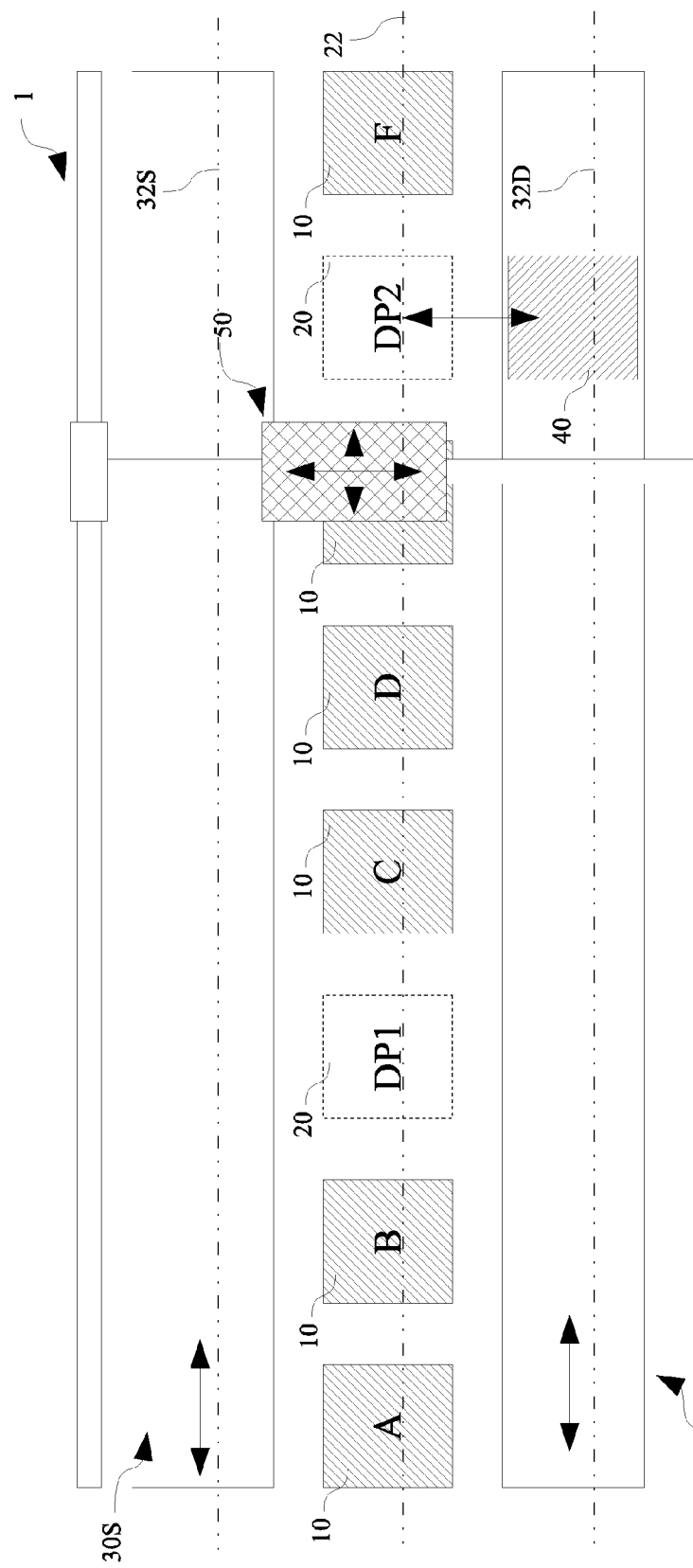

FIGS. 10A and 10B show still a further alternative embodiment in which, similarly as for the embodiment of FIG. 9, the further pallet transporter 30S for the source pallets 10 is separate from the pallet transporter 30D the destination pallet 40. Here both the pallet transporter 30D for the destination pallet 40 and the further pallet transporter 30S for the source pallets are shown to be a suitable conveyor. The conveyor 30S for the source pallets 10 can be operated faster than the conveyor 30D for the destination pallets 40 as explained above. However according to this specific embodiment in order to still further reduce risks related to the possible decrease in stability of the mixed layer destination pallet 40 and in order to handle concurrent mixing operations involving a plurality of destination pallets, according to the embodiment of FIGS. 10A and 10B there are provided specific pallet positions labelled as DP1 and DP2 where a destination can be suitably positioned under control of the controller 60 during a mixing operation. In this way the positioning of the destination pallet 40 is more discontinuous when compared to the embodiments described above. This means that for example, when performing a mixing operation to compile a destination pallet with pallet layers from products labelled A, C and E, first the destination pallet will be positioned at the pallet position 20 labelled DP1 by the conveyor 30D as shown in FIG. 10A. The conveyor 30D in cooperation with a suitable device then transferring the destination pallet 40 from the conveyor 30D to this pallet position 20 labelled DP1. The layer transporter 50 can already concurrently pick the desired number of pallet layers of product A, however it might be preferred in function of the stability of the mixed layer destination pallet to wait before placing these pallet layers of product A on the destination pallet 40 until it is securely positioned at the pallet position 20 labelled DP1. Then the layer transporter 50 can be controlled to pick the desired number of pallet layers of product C and subsequently place it at the destination pallet 40 still at pallet position 20 labelled DP1. As the source pallet 40 during these layer transfer operations is not present on the conveyor 30D, the conveyor 30D can be suitably controlled to position one or more other destination pallets 40 for example involved in concurrent mixing operations without affecting the mixing operation involving the destination pallet positioned at the pallet position 20 labelled DP1. Subsequently when the control system 60 detects that the next layer transfer for the destination pallet 40 involves a source pallet 10 comprising products E that is positioned at a pallet position 20 for which the transfer distance 70 exceeds a predetermined threshold 72, this source pallet 40 is positioned back on the conveyor 30D and transported from the pallet position 20 labelled DP1 to a suitable pallet position DP2 for which the transfer distance 70 is lower than this predetermined threshold 72. Concurrently the separately movable layer transporter 50 can already pick the desired number of pallet layers of products F, but for example preferably waits with placing these pallet layers on the destination pallet until it is securely positioned at the pallet position 20 labelled DP2 in order to ascertain sufficient stability for this mixed layer destination pallet 40. As further shown in FIG. 10A during the layer transfer operations when the destination pallet 40 is positioned at pallet position DP1, the fast moving conveyor 30S can efficiently resupply the suitable pallet position 20 labelled SPE for the source pallet 10 comprising pallet layers with products E so that they are available for the layer transfer operations when the destination pallet 40 is positioned at pallet position DP2 as shown in FIG. 10B.

It is clear that according to further alternative embodiments of the embodiments mentioned above with separate pallet transporters 30S, 30D for the source pallets 10 and destination pallets 40 respectively. For example different combinations of specific embodiments of suitable separate pallet transporters 30S, 30D than those mentioned above are possible, as long as in general the allowable maximum acceleration and/or velocity of the pallet transporter 30S for the source pallets 10 is higher than that of the pallet transporter 30D for the destination pallet 40. In this respect it is for example beneficial for the pallet transporter 30D of the destination pallets 40 comprising mixed layers and an associated reduction in structural stability to be controlled by the controller 60 with a soft-start or soft-stop functionality. It is further also clear that according to alternative embodiments a different number of these separate pallet transporters could be present for serving any suitable number of pallet positions. According to one example a single destination pallet conveyor 30D could serve a plurality of rows of pallet positions each being resupplied with source pallets from a corresponding plurality of source pallet conveyors 30S. Additionally it is clear that as explained above, a modular setup could be provided in which each of the elements involved in the automatic layer picking assembly serve a particular layer transfer area. It is also clear, especially when the pallet transporter 30 is a conveyor, that it can also concurrently position any suitable plurality of source or destination pallets.

It is also clear that the layer transporter 50 according to some embodiments can transfer a suitable plurality of pallet layers during a layer transfer operation from a source pallet to a destination pallet. According to still a further alternative embodiment the layer transporter 50 could further be suited to transfer an entire source pallet or destination pallet, this could for example be useful, when the pallet transporters 30 are conveyors and the source pallets 10 or destination pallets 40 need to be positioned on and off the conveyor to a particular pallet position 20, which in such a case could be effected by the same device as for the layer transfer operation.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfill the functions of several means recited in the claims. Any reference signs in the claims shall not be construed as limiting the respective claims concerned. The terms "first", "second", "third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. An automatic layer picking assembly, comprising:
   a plurality of source pallets each positioned at a pallet position and each comprising products arranged in a plurality of pallet layers;
   at least one pallet transporter including a pallet positioner operable to position a pallet with respect to the pallet positions, and operable to transport a destination pallet during a mixing operation comprising a plurality of layer transfer operations;
   a movable layer transporter including a layer picker and a layer positioner, and operable to transfer at least one pallet layer from a source pallet to a destination pallet during a layer transfer operation of the mixing operation;
   a controller coupled to the at least one pallet transporter and the movable layer transporter, and operable to control them such that, during the plurality of the layer transfer operations of the mixing operation, a predetermined destination pallet receives a mixing set of a plurality of the pallet layers from a predetermined set of a plurality of the source pallets;
   wherein the layer positioner is operable to position the movable layer transporter with respect to the predetermined pallet positions separately from the pallet transporter during the mixing operation,
   wherein, during each of the layer transfer operations of the mixing operation, during which at least one predetermined pallet layer is transferred from a predetermined source pallet to a predetermined destination pallet on a predetermined pallet transporter, the controller is further configured to control the movable layer transporter such that:
     the movable layer transporter's layer positioner positions the moveable layer transporter at the pallet position of the predetermined source pallet;

the movable layer transporter's layer picker picks the at least one predetermined pallet layer from the predetermined source pallet;

the movable layer transporter's layer positioner positions the at least one predetermined pallet layer at the predetermined destination pallet on the predetermined pallet transporter;

the movable layer transporter's layer picker places the at least one predetermined pallet layer from the predetermined source pallet on the predetermined destination pallet; and the controller is further configured to control the pallet transporter such that:

the pallet transporter's pallet positioner reduces a transfer distance between the predetermined source pallet and the predetermined destination pallet (i) while the layer positioner positions the movable layer transporter at the pallet position of the predetermined source pallet, and (ii) before the layer picker picks the at least one predetermined pallet layer from the predetermined source pallet.

2. An automatic layer picking assembly according to claim 1, wherein the controller is further configured to control the pallet transporter such that:

the pallet transporter's pallet positioner reduces the transfer distance after the layer picker picks the at least one predetermined pallet layer from the predetermined source pallet and while the layer positioner positions the predetermined source pallet layer at the predetermined destination pallet on the predetermined pallet transporter.

3. An automatic layer picking assembly according to claim 1, wherein the controller is further configured to control the pallet transporter such that the pallet transporter's pallet positioner reduces the transfer distance until it reaches a predetermined threshold.

4. An automatic layer picking assembly according to claim 1, wherein the automatic layer picking assembly comprises a plurality of pallet transporters concurrently operable to transport a destination pallet during a plurality of concurrent mixing operations, and in that the controller is further configured to concurrently control:

wherein one of the plurality of pallet transporters to cooperate with the layer transporter during the layer transfer operation of one of the concurrent mixing operations;

wherein another of the plurality of pallet transporters such that the pallet transporter's pallet positioner reduces the transfer distance for the next layer transfer operation of another of the concurrent mixing operations.

5. An automatic layer picking assembly according to claim 1, wherein the controller is further operable to control the at least one pallet transporters and the movable layer transporter such that during the layer transfer operation the predetermined destination pallet receives the at least one predetermined pallet layer from the predetermined source pallet without making use of an intermediate buffer or splitting up the pallet layer into individual articles.

6. An automatic layer picking assembly according to claim 5, wherein:

the pallet positions of source pallets are arranged linearly, adjacent to each other along a plurality of pallet position lines; and the pallet transporter is operable to move along at least one pallet transporting line generally parallel to and in between two pallet position lines.

7. An automatic layer picking assembly according to claim 1, wherein:

the pallet positions of source pallets are arranged linearly, adjacent to each other along at least one pallet position line; and the pallet transporter is operable to move along at least one pallet transporting line generally parallel to at least one pallet position line.

8. An automatic layer picking assembly according to claim 1, wherein the automatic layer picking assembly includes a plurality of movable layer transporters.

9. An automatic layer picking assembly according to claim 8, wherein each of the movable layer transporters is operable to move in a layer transfer area at least partly comprising at least one of the pallet transporting lines and the adjacent pallet position lines.

10. An automatic layer picking assembly, according to claim 1, wherein at least one of the pallet transporters operable to transport a destination pallet, is further configured to position a source pallet at a pallet position.

11. An automatic layer picking assembly, according to claim 1, wherein the automatic layer picking assembly comprises at least one further pallet transporter separate from the at least one pallet transporter operable to transport a destination pallet, this further pallet transporter operable to position a source pallet at a pallet position with a higher speed and/or acceleration than the at least one pallet transporter operable to transport a destination pallet.

12. An automatic layer picking assembly according to claim 1, wherein the pallet transporter comprises one of the following devices:

an automatic guided vehicle;

a vehicle operable to move along a track;

a robotic vehicle;

a conveyor; and/or wherein the movable layer transporter is a gantry robot comprising a pallet layer manipulator.

13. An automatic layer picking assembly, comprising:

a plurality of source pallets each positioned at a pallet position and each comprising products arranged in a plurality of pallet layers;

at least one pallet transporter including a pallet positioner operable to position a pallet with respect to the pallet positions, and operable to transport a destination pallet during a mixing operation comprising a plurality of layer transfer operations;

a movable layer transporter including a layer picker and a layer positioner, and operable to transfer at least one pallet layer from a source pallet to a destination pallet during a layer transfer operation of the mixing operation;

a controller coupled to the at least one pallet transporter and the movable layer transporter, and operable to control them such that, during the plurality of the layer transfer operations of the mixing operation, a predetermined destination pallet receives a mixing set of a plurality of the pallet layers from a predetermined set of a plurality of the source pallets;

wherein the layer positioner is operable to position the movable layer transporter with respect to the predetermined pallet positions separately from the pallet transporter during the mixing operation, wherein, during each of the layer transfer operations of the mixing operation, during which at least one predetermined pallet layer is transferred from a predetermined source pallet to a predetermined destination pallet on a predetermined pallet transporter, the controller is further configured to control the movable layer pallet transporter such that:

the pallet transporter's pallet positioner reduces a transfer distance between the predetermined source pallet and the predetermined destination pallet
(i) while the layer positioner positions the movable layer transporter at the pallet position of the predetermined source pallet, and
(ii) before the layer picker picks the at least one predetermined pallet layer from the predetermined source pallet.

14. An automatic layer picking assembly according to claim 13, wherein the controller is further configured to control the pallet transporter such that:

the pallet transporter's pallet positioner reduces the transfer distance after the layer picker picks the at least one predetermined pallet layer from the predetermined source pallet and while the layer positioner positions the predetermined source pallet layer at the predetermined destination pallet on the predetermined pallet transporter.

15. An automatic layer picking assembly according to claim 13, wherein the controller is further configured to control the pallet transporter such that the pallet transporter's pallet positioner reduces the transfer distance until it reaches a predetermined threshold.

16. An automatic layer picking assembly according to claim 13, wherein the automatic layer picking assembly comprises a plurality of pallet transporters concurrently operable to transport a destination pallet during a plurality of concurrent mixing operations.

17. An automatic layer picking assembly according to claim 16, wherein the controller is further configured to concurrently control:
a first pallet transporter of the plurality of pallet transporters to cooperate with the movable layer transporter during the layer transfer operation of one of the concurrent mixing operations, and
a second pallet transporter of the plurality of pallet transporters such that the second pallet transporter's pallet positioner reduces the transfer distance for the next layer transfer operation of another of the concurrent mixing operations.

18. A method for composing a mixed layer pallet including a plurality of pallet layers of different products by an automatic layer picking assembly, the automatic layer picking assembly including a plurality of source pallets each positioned at a pallet position and each comprising products arranged in a plurality of pallet layers, at least one pallet transporter including a pallet positioner, a movable layer transporter including a layer picker and a layer positioner, and a controller coupled to the at least one pallet transporter and the movable layer transporter, the method comprising:

transporting, by the at least one pallet transporter, a destination pallet during a mixing operation including a plurality of layer transfer operations;

transferring, by the movable layer transporter, at least one pallet layer from a source pallet to a destination pallet during a layer transfer operation of the mixing operation;

controlling the at least one pallet transporter and the movable layer transporter, by the controller, such that, during the plurality of the layer transfer operations of the mixing operation, a predetermined destination pallet receives a mixing set of a plurality of the pallet layers from a predetermined set of a plurality of the source pallets;

positioning, by the layer positioner, the movable layer transporter with respect to the predetermined pallet positions separately from the pallet transporter during the mixing operation.

19. The method according to claim 18, further comprising:

reducing, by the pallet transporter's pallet positioner, a transfer distance between the predetermined source pallet and the predetermined destination pallet
(i) while the layer positioner positions the movable layer transporter at the pallet position of the predetermined source pallet, and
(ii) before the layer picker picks the at least one predetermined pallet layer from the predetermined source pallet.

20. The method according to claim 18, further comprising positioning, by the movable layer transporter's layer positioner, the movable layer transporter at the pallet position of the predetermined source pallet;

picking, by the movable layer transporter's layer picker, the at least one predetermined pallet layer from the predetermined source pallet;

positioning, by the movable layer transporter's layer positioner, the at least one predetermined pallet layer at the predetermined destination pallet on the predetermined pallet transporter; and picking, by the movable layer transporter's layer picker, the at least one predetermined pallet layer from the predetermined source pallet on the predetermined destination pallet.

* * * * *